United States Patent Office 3,647,703
Patented Mar. 7, 1972

3,647,703
SYNERGISTIC COMPOSITION AND ITS USE
Bernard F. Shema, Glenside, Robert H. Brink, Jr., Doylestown, and Paul Swered, Philadelphia, Pa., assignors to Betz Laboratories, Inc., Trevose, Pa.
No Drawing. Filed Jan. 2, 1970, Ser. No. 443
Int. Cl. A01n 9/120; A61k 23/00
U.S. Cl. 252—180
12 Claims

ABSTRACT OF THE DISCLOSURE

The present invention relates to certain processes and compositions useful for inhibiting the growth of slime in water employed for industrial purposes, particularly water employed in the manufacture of pulp and paper, water employed in cooling water systems, as well as other industrial waters. The novel processes and compositions of the present invention are processes or mixtures which show unexpected synergistic activity against microorganisms, including bacteria, fungi and algae, which produce slimes in aqueous systems or bodies which are objectionable from either an operational or aesthetic point of view. Specifically, the invention is directed to the use of compositions comprising a combination of 3,5-dimethyltetrahydro-1,3,5-2H-thiadiazine-2-thione and a mixture comprising 2-nitro-2-ethyl-1,3-dimorpholino propane, and N-(2-nitrobutyl)morpholine.

BACKGROUND OF THE INVENTION

The novel processes or compositions of the present invention are combinations comprising from 5% to 95% by weight of 3,5-dimethyltetrahydro-1,3,5-thiadizine-2-thione and from 95% to 5% by weight of a mixture of 2-nitro-2-ethyl-1,3-dimorpholino propane and N-(2-nitrobutyl)morpholine. When these two ingredients are mixed in the stated amounts, the resulting mixtures possess a high degree of slimicidal activity which could not have been predicted beforehand from the known activity of the individual ingredients comprising the mixture. By means of the present invention, it is therefore possible to produce a more effective slime-control agent than has previously been available. It is a particular advantage of the present invention that the compositions may be made more economically than slimicides generally used in industry.

The compound 3,5-dimethyltetrahydro-1,3,5-2H-thiadiazine-2-thione, hereafter referred to as the "thione compound" is a known compound and is commercially available from Stauffer Chemical as N–521.

The mixture of 2-nitro-2-ethyl-1,3-dimorpholino propane and N-(2-nitrobutyl)morpholine which is commercially available as Vancide F–5386, generally comprises on a weight basis 50% of each ingredient.

The thione compound has demonstrated high efficiencies in the control of microorganisms present in the aqueous systems utilized in the manufacture of paper products, e.g., paper mill white water, and in cooling, e.g., the water used in cooling towers, air washers, and the like. The presence of microorganisms in such systems generally impairs their efficiency and in the case of paper and pulp products may irreparably contaminate and/or reduce the quality and production rate of the final product.

Accordingly, it is an object of the present invention to provide biocidal compositions which are effective at low concentrations against the microorganisms present in the water employed in paper and pulp mills, cooling systems, and the like. Most desirable, of course, is the provision of biocidal compositions which possess the biocidal effectiveness of the particular thione compound but which will yield an advantageous cost-performance value.

The objects of the invention are achieved by combining the thione with the 2-nitro-2-ethyl-1,3-dimorpholino propane, N-(2-nitrobutyl)morpholine mixture. By means of such a combination, the total quantity of biocide required for effective treatment may be reduced. In addition, the high degree of biocidal effectiveness which is provided by the thione may be exploited without the use of the higher concentrations of the thione. Furthermore, the combination provides an unexpected synergistic relationship in which the cooperative action of the combined ingredients yields a total effect which is greater than the sum of the effects of the two ingredients taken separately.

To demonstrate the synergism which is provided by the inventive combination of compound, as well as the low concentrations of the thione which are made possible in the highly effective biocidal compositions of the invention, the data set forth in Table 1 has been prepared.

EXAMPLE 1

The synergism of the compositions of the present invention is shown in Table 1 below. These tests were made in the laboratory with an agar substrate procedure. This procedure in these examples consists of adding the material under test to a nutrient substrate in the amount to give the desired concentration in parts per million. The medium used for the bacteria (*Aerobacter aerogenes*) is Nutrient Agar (trypticase-glucose extract). The inhibiting concentration is that concentration which does not support the growth of the test organisms. The values expressed in Table 1 are obtained by calculating a value from the inhibiting concentrations. The data show the existence of synergism to a marked degree in all cases. The values reported are the sums of the ratio $QA \div Qa$ and $QB \div Qb$. QA and QB are the quantities of Compound A and Compound B used in the mixture producing an end point, and Qa and Qb are the minimum inhibitory concentrations of Compounds A and B, respectively, which will produce an end point. When the sum of this value is 1, the effect is the same as the toxic effect of each of the components of the mixture and there is no synergism. When the sum of the ratio is greater than 1, the compounds are not compatible one detracts from the effect of the other) and there is no synergism.

As may be seen by inspection of Table 1, all of the compositions of the present invention produce a synergistic effect against the test organisms.

TABLE I

Synergism summary of varying percentages of the thione and the 50–50 mixture of 2-nitro-2-ethyl-1,3-dimorpholino propane and N(2-nitrobutyl) morpholine (referred to as the "mixture")

| Percent | | Synergistic |
|---|---|---|
| Thione | Mixture | index [1] |
| 95 | 5 | .78 |
| 90 | 10 | .76 |
| 50 | 50 | .78 |
| 5 | 95 | .58 |

[1] $(QA \div Qa) + (QB \div Qb)$.

It will be evident from the data recorded above that compositions of the present invention function to control slime growth due to microorganisms not only at equal portions of the thione with the mixture but also where just minor amounts of one or the other is present. This finding of synergism at the lower levels is extremely valuable since it illustrates conclusively that the ingredients are synergistically compatible.

The mode of establishing the synergistic behavior of the compositions of the present invention is a widely used and an industrially acceptable procedure. Although it is believed that the above is sufficient in explaining the procedure for further explanation thereof reference can be made to U.S. Pat. 3,231,509 and its file history where data of this nature was considered to be acceptable. Moreover, the article by Kull et al. published in "Applied Microbiology" 9, 1961, pp. 538–541, will furnish additional information in this regard.

For the testing to ascertain synergistic behaviour, *Aerobacter aerogenes* was utilized since this microorganism is found to exist and found to be most troublesome in pulp and paper producing processes, as well as in cooling towers. Moreover, this microorganism is difficult to control and/or kill and accordingly its existence does give rise to troublesome slime. In view of the foregoing, it can then be appreciated that since *Aerobacter aerogenes* is prevalent in most slime-affected systems and since this microorganism is difficult to control or kill and in many instances more difficult to kill than fungus such as *Penicillium expansum* and *Aspergillus niger* or algae, that once control of this microorganism is maintained, then for all practical purposes the total microorganism population with its different types is considered to be controlled.

When the inventive compositions are employed in the treatment of cooling or paper mill water, they are preferably utilized in the form of relatively dilute solutions. For example, a preferred solution comprises between 5% to 65% by weight of the synergistic combination in the admixture with various solvents and solubilizing agents. An example of such a synergistic composition comprises between 5% to 65% by weight of the synergistic combination in admixture with various solvents and solubilizing agents. An example of such a synergistic composition comprises 10% by weight of the mixture of 2-nitro-2-ethyl-1,3-dimorpholino propane, and N-(2-nitrobutyl) morpholine, 10% by weight of the thione and the remainder composed of such materials as lower alkanols, surfactants, organic solvents such as the aliphatic and aromatic hydrocarbon solvents and/or water.

Surfactants such as the alkylaryl polyether alcohols, polyether alcohols, sulfonates and sulfates, and the like, may also be employed to enhance the dispersibility and stability of these dispersions. The foregoing solutions of the biocidal compositions are utilized in order to insure the rapid and uniform dispersibility of the biocides within the industrial water which is treated. It has been found that either aqueous or non-aqueous solvents are generally suitable in the preparation of compositions of the invention, e.g., alcohols, aliphatic and aromatic hydrocarbon. Based upon the synergism study as outlined above, it was ascertained that in the treatment of paper mill and cooling water, effective biocidal action is obtained when the concentration or treatment level of the combination or admixture of biocides, i.e., the mixture of the thione, is between 0.5 part per million to 1000 parts per million, and preferably between 1 and 100 parts per million, based upon the total content of the system treated, i.e., total quantity of cooling water or paper mill water. The compositions may be utilized for the preservation of slurries and emulsions containing carbohydrates, proteins, fats, oils, etc. Dosage or treatment levels for this utility will range in the vicinity of 0.5%. The compositions of the invention which can be prepared by merely combining the respective ingredients and mixing thoroughly at standard conditions, may be fed continuously to the treated system, e.g., by means of a metered pump, or may be fed periodically at intervals calculated to control the growth of slime-forming organisms in the system. Naturally, in the treatment of cooling water the feeding of the inventive compositions must be designed to compensate for blowdown in those systems which employ that expedient. The treatment of any system, of course, is dependent upon the severity of the problem. Accordingly, there is great latitude in the treatment levels which can be used.

Although the thione compound has been limited in this description to a specific thione, it is obvious that slight modifications of this compound would also operate in the same manner. Likewise, while the mixture has been described as a 50–50 (weight basis) mixture of 2-nitro-2-ethyl-1,3-dimorpholino propane and N-(2-nitrobutyl)morpholine, it is again obvious that variations in the percentage by weight of the respective ingredients in the mixture would yield the same effects as well as slight chemical modifications of the chemical structure. Those modifications would be obvious to the worker once apprised of the invention. Accordingly, modifications of this nature are included within the general scope of the invention.

In order to establish the effectiveness of the synergistic combination in combatting or controlling slime formation which was being experienced in various paper and pulp mills; the combination was tested with water samples derived from actual mills. More specifically, actual water samples were taken from pulp and paper mills which were experiencing slime problems due to the microorganism population of the water. As is well known, slime problems are generally caused by a combination of microorganisms, which although primarily bacteria and fungus, in some cases also includes algae. As would be expected, the inventive compositions may be added to the cooling water or the pulp and paper mill systems at any convenient point. Naturally, in once-through or non-circulating systems, the composition must be added upstream from the point or points at which microorganism control is desired. In circulating systems or pulp and paper systems, the compositions may be added at any point, provided the time lapse and the conditions experienced between point of addition and the point at which the effect of the composition is experienced are not so drastic as to result in the neutralization of the effect of the composition. The samples taken were subjected to a respirometer evaluation which in effect established the property of the synergistic combination at specific treatment levels to inhibit the growth of the microorganisms of the sample.

Respirometer techniques are widely used to evaluate the biocidal activity of various materials. The techniques and the instruments themselves are described in Manometric Techniques, Umbreit et al., 4th edition, 1964, Burgess Publishing Company, Minneapolis, Minnesota. Generally, the procedure used entails adding a sample of the water which was taken from the operating mill to a manometer flask, together with dilutions of the synergistic combination. The samples of water which were used to evalute the present combinations were taken from the white water of various pulp and paper mills. The manometer flask is equipped with a center well into which is placed a known volume and concentration of potassium hydroxide. The potassium hydroxide possesses the property of absorbing carbon dioxide. The flasks bearing the respective solutions are attached to the manometer and incubated with shaking in a constant temperature bath. The microbial population in the water sample in normal respiration will consume a certain amount of oxygen from the closed gas phase between the surface of the water sample and the manometer fluid. Concurrent with the consumption of oxygen is the evolution of carbon dioxide which is absorbed by the potassium hydroxide contained by the center wall. The changes in manometer settings are related to the utilization of oxygen by the microorganism population in the sample. Inhibition of the respiration of the microbial population by the added synergistic combination is determined by comparing manometer readings with readings obtained from samples treated accordingly which contain no synergistic combination.

The procedure not only indicates the effectiveness or the ineffectiveness as the case might be, of the combination to control the respiration of lime forming microorganisms at various treatment levels, but also indicates the effectiveness of the composition in controlling growth of microorganisms. In addition, the procedure permitcorrelation of its efficacy or inefficacy with field conditions since actual white water samples from mills experiencing slime problems are employed. Accordingly, the intended purpose of the product, i.e., the control of slime-forming organisms found in commercial systems, is directly evaluated.

Specific embodiments

The synergistic blends evaluated were produced simply by thoroughly mixing a composition comprising the listed components in the specified percentage by weight.

EXAMPLE 2

| | Percent |
|---|---|
| Mixture of 50% 2-nitro-2-ethyl-1,3-dimorpholino propane and 50% N-(2-nitrobutyl) morpholine (weight basis) | 10 |
| 3,5 - dimethyl tetrahydro - 1,3,5 - 2H - thiadiazine - 2-thione | 10 |
| Isopropanol | 15 |
| Sodium hydroxide | 6 |
| Non-ionic surfactant (isooctylphenoxy - polyethoxy ethanol, e.g., Triton X–114) | 5 |
| Water | 54 |

EXAMPLE 3

The composition of this example was composed of:

| | Percent |
|---|---|
| Propane-morpholine mixture of Example 2 | 15 |
| Thione compound of Example 2 | 15 |
| Isopropanol | 15 |
| Triton X–114 | 5 |
| Sodium hydroxide | 9 |
| Water | 41 |

EXAMPLE 4

The composition of this sample was composed of:

| | Percent |
|---|---|
| Propane-morpholine mixture of Example 2 | 15 |
| Thione compound of Example 2 | 5 |
| Isopropanol | 15 |
| Sodium hydroxide | 5 |
| Water | 60 |

The compositions obtained in accordance with Examples 2 through 4 were evaluated utilizing the above described respirometer method. The percentage inhibition at the particular treatment levels are recorded in the following Table 2 for each of the compositions. The table, in addition, sets forth the fact that the white water samples tested were derived from different pulp and paper mills. These mills in every case were different and are identified respectively as Mills A through H.

TABLE 2

| Composition of Example: | Water sample derived from mill— | Percentage inhibition at— | | | | | |
|---|---|---|---|---|---|---|---|
| | | 1.25 p.p.m. | 2.5 p.p.m. | 5.0 p.p.m. | 12.5 p.p.m. | 25 p.p.m. | 50 p.p.m. |
| 2 | A[1] | | 11 | 30 | 62 | 73 | 77 |
| 2 | B | 20 | | 68 | 69 | 69 | 71 |
| 2 | C | | 3 | 20 | 50 | 65 | 75 |
| 2 | D | 17 | 22 | 56 | 88 | 91 | 94 |
| 2 | E | 18 | 36 | 59 | 86 | 89 | 91 |
| 2 | F | 27 | 47 | 53 | | 79 | 88 |
| 3 | F | 27 | 48 | 65 | 73 | 75 | 78 |
| 4 | F | 34 | 65 | 58 | 68 | 67 | 77 |
| 2 | G | 10 | 23 | 46 | 64 | 71 | 82 |
| 3 | G | 26 | 48 | 62 | 75 | 81 | 86 |
| 4 | G | 22 | 43 | 57 | 67 | 80 | 85 |
| 2 | H | 17 | 37 | 56 | 85 | 82 | 82 |
| 3 | H | 40 | 63 | 82 | 85 | 96 | 94 |
| 4 | H | 20 | 52 | 77 | 96 | 99 | 100 |

[1] White water.

The respirometer study concluded that effective control or effective inhibition of the microbial population of the water samples could be obtained by the use of the synergistic combination of the present invention. Percentage inhibitions within the range of 70 percent or better are considered by industry to be attractive. Accordingly, it is obvious from the data recorded in Table 2 that the composition of the present invention fulfills the prerequisite.

It should be noted that while the preponderance of evidence has been derived from the treatment of paper and pulp mill aqueous systems, the compositions and methods of the present invention are broadly applicable to the treatment of aesthetic waters as well as industrial waters such as cooling waters which are plagued by deposits formed by slime forming organisms, or by the very presence of such organisms.

Having thus described the invention what is claimed is:

1. A composition of matter comprising the combination of between about 5% to 95% by weight of a mixture comprising about 50% by weight of each 2-nitro-2-ethyl-1,3-dimorpholino propane and N-(2-nitrobutyl)morpholine and between about 95% to 5% by weight of 3,5-dimethyltetrahydro-1,3,5-2H-thiadiazine-2-thione.

2. A composition according to claim 1 in which said thione is present in a quantity of 50% by weight and said mixture is present in a quantity of 50% by weight.

3. A composition as claimed by claim 1 in which between 5% to 65% by weight of said combination is dissolved in between 35% to 95% by weight of an aqueous solvent.

4. A composition as claimed by claim 3 in which said aqueous solvent is a solution of water, a lower alkanol and a surfactant.

5. A method for the control of slime in industrial water, comprising adding to said water the combination of between about 5% to 95% by weight of a mixture comprising about 50% by weight of each 2-nitro-2-ethyl-1,3-dimorpholino and N-(2-nitrobutyl)morpholine and between about 5% to 95% by weight of said 3,5-dimethyltetrahydro-1,3,5-2H-thiadiazine-2-thione.

6. A method according to claim 5 in which said combination is added to said water in an amount of between 0.5 to 1000 parts per million parts of water.

7. A method according to claim 6 wherein said combination is added to said water as a composition between 5% to 65% by weight of said composition in between 35% and 95% by weight of said aqueous solvent.

8. A method as claimed by claim 6 in which said thione is present in a quantity of 50% by weight and said mixture is present in a quantity of 50% by weight.

9. A method as claimed by claim 8 in which said combination is added to said water as a composition comprising between about 5% to 65% by weight of said combination in between 35% to 95% by weight of said aqueous solvent.

10. A method as claimed by claim 9 in which said aqueous solvent is a solution of water, a lower alkanol and a surfactant.

11. A method according to claim 6 wherein said industrial water is the aqueous system of a paper and pulp mill.

12. A method according to claim 6 wherein said industrial water is the water of a cooling water system.

References Cited

UNITED STATES PATENTS

| 3,231,509 | 1/1966 | Shema | 21—58 |
| 3,324,120 | 6/1967 | Steimmig | 260—247 X |
| 3,497,506 | 2/1970 | Traber | 252—106 |
| 3,513,234 | 5/1970 | Traber | 242—106 |
| 3,532,793 | 10/1970 | Traber | 252—106 X |

JOHN T. GOOLKASIAN, Primary Examiner

M. E. McCAMISH, Primary Examiner

U.S. Cl. X.R.

21—58; 210—64